March 26, 1929.   H. KAUWERTZ   1,707,058
DEVICE FOR MIXING LIQUIDS IN VARIABLE PROPORTIONS
Filed Sept. 27, 1926
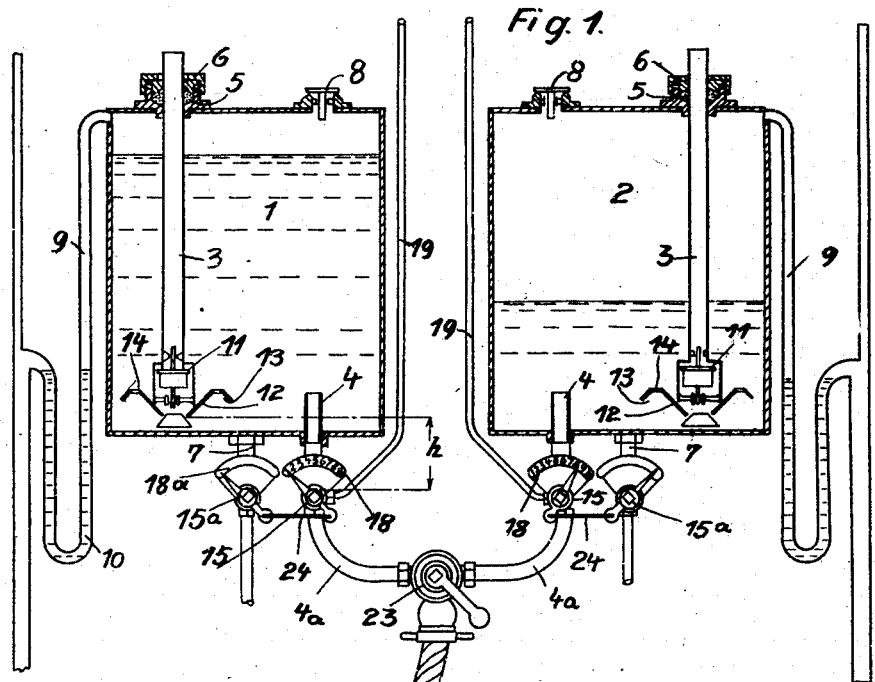
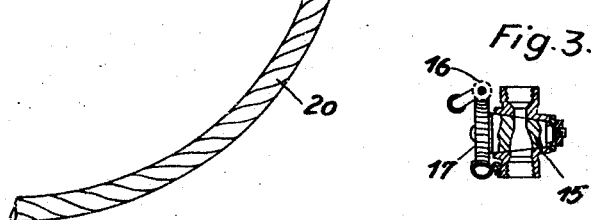
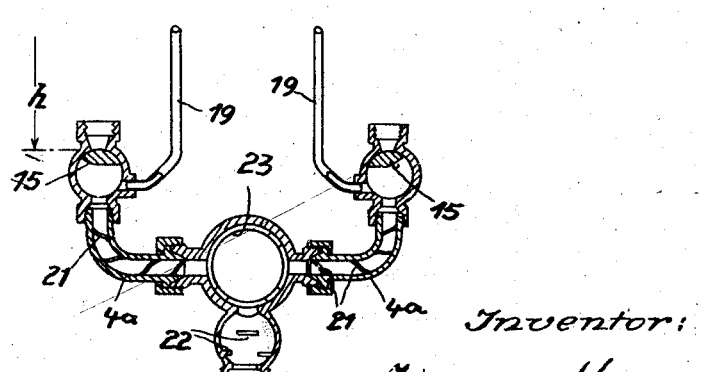
Inventor:
Hermann Kauwertz Patented Mar. 26, 1929.

1,707,058

UNITED STATES PATENT OFFICE.

HERMANN KAUWERTZ, OF COLOGNE-LINDENTHAL, GERMANY.

DEVICE FOR MIXING LIQUIDS IN VARIABLE PROPORTIONS.

Application filed September 27, 1926, Serial No. 138,076, and in Germany September 28, 1925.

My invention refers to a device for the mixing of liquids in any proportion of quantity desired. Hitherto it has been necessary to measure off the required quantity of each component of a mixture separately in turn, to fill the measured-off quantities into a common recipient, and therein to mix the component ingredients together to as homogeneous a mass as possible by means of mechanical stirring devices. This process necessitated a previous preparation, and therefore a storing of the mixtures until the time came for their being used, and while they were being stored it was impossible to prevent unmixing taking place owing to the ingredients settling down according to their respective specific weight. By means of the invention the mixtures are not prepared until just before they are drawn off, and the mixing is done by utilizing the drawing-off movement, so that not only do all mechanical measuring and stirring devices become unnecessary, but at the moment of drawing off and thus at the moment of use there is produced an absolutely homogeneous mixture. The drawing off and the mixing are thus accomplished simultaneously. The invention consists in the fact, that the rate of the flow of the component ingredients through the adductor pipes is controlled and determined by devices which vary the cross-section of the pipes according to the quantity proportions required, and that the flow of the ingredients through these devices takes place simultaneously, and that the ingredients, measured off in this way according to their rate of flow, are brought together into a common pipe. Even if these quantities of liquids, thus measured off in proportion of their rate of flow, were merely then passed on alongside one another, the respective cross-section would ensure their being present in the required mixing proportion. As however the separate particles of a quantity of liquid never move in a straight line, there is set up already by the bringing together of the ingredients of the mixture an intimate commingling action, which may be intensified by means of devices for facilitating the mixing as for instance by means of spiral passage-walls, baffle plates, rotating mixing-worms or pumps and the like. Exactness in the measuring off of each ingredient of the liquid mixture requires that the pressure which produces the flow-movement shall remain equal. In order to render the degree of pressure independent of the position of the surface of the liquid in the containing vessel, the containing vessel has according to my invention to be made in the form of a Mariotte jar, in which the pressure-equalizing dip-pipes can be made adjustable to vary the effective pressure. To obviate any suction-effect arising behind the device which regulates the variation in section in the run-off pipe of the containing vessel such as might impair the degree of accuracy of the measuring-off, my invention provides for the interior of said device communicating with the outside air. Further, in order to prevent the liquid, when the recipient is being filled, from entering the dip-pipe which equalizes the pressure on the Mariotte principle which entrance would at the beginning cause the flow-movement to be produced by a pressure higher for the weight of that quantity of liquid, my invention provides at the lower end of the said dip-pipe a floating valve or the like that prevents the liquid from entering into said dip-pipe but allows air or gas to pass through said dip-pipe in the opposite direction. Moreover, the lower end of the dip-pipe is provided with devices for distributing the air or gases used to equalize the pressure. In order to enable the container built as a Mariotte's jar to be refilled at any time with liquid, there is affixed at the highest point of same a check valve and an overflow pipe closed by a siphon. According to my invention the supply pipe for fresh liquid is provided with a cut-off device serving to alter gradually the passage-section, in like manner to the let-off pipe, so that the quantity of fresh liquid can be adjusted to remain closely behind the quantity flowing-off, with a view to an uninterrupted functioning of the drawing-off of the measured liquid. Thus, the liquid flowing in cannot in any way affect the height of liquid producing the flow-pressure in the measuring-off pipe. Furthermore the cut-off device of the supply pipe can be coupled to work so automatically in connection with the let-out pipe, that whenever any of the liquid mixture is drawn off fresh liquid starts again to flow automatically into the recipients for the component ingredients.

In order to more fully explain my invention, I will now describe, by way of example, an embodiment of the same as illustrated in the accompanying drawing in which:

Fig. 1 is an elevation partly shown in section.

Fig. 2 shows in section the regulators for the cross-section of the liquid-abducting pipes, and Fig. 3 illustrates, by means of a detail view, a fine adjustment for the cut-off device regulating the rate of flow.

In the apparatus illustrated it is assumed that it is a question of mixing two liquids, contained respectively in the vessels 1 and 2. These vessels are constructed as Mariotte jars, and are as such completely closed and provided with a dip-pipe 3 communicating with the outer air or with a gas-reservoir. The discharge of the liquid takes place through the pipes 4, which in this case project into the interior of the containing vessels and terminate above the lower orifice of the dip-pipe 3. The dip-pipe 3 is introduced through a packing-box 5 and a threaded cap nut 6, and can be adjusted in its effective position in regard to the pipe 4. The introduction of fresh liquid takes place through the pipe 7. In order to enable fresh liquid to be introduced at any moment, there is arranged at the highest point of each liquid-containing vessel an automatic stop valve 8 opening outwards, enabling the air to escape through pipe 7 when fresh liquid is introduced. A continually open overflow-pipe 9 is provided with a liquid seal 10.

In order to prevent liquid from entering the interior of dip-pipe 3 when liquid is being filled into the liquid-container, there is arranged on the lower end of said pipe, the end being made to widen out for the purpose, a floating valve 11, which shuts off entrance into the interior of the dip-pipe, without however hindering the passing of gas in the opposite direction. In order to effect as wide as possible a distribution of the quantity of air or gas which in accordance with the Mariotte principle flows in when the pressure is being equalized, there is arranged at the lower orifice of the dip-pipe a distributing-cone 12, on which the air- or gas-bubbles bubble up. The distribution of these air- or gas-bubbles can be increased by a catch-ring 13, the bottom of which is provided with fine perforations 14.

In the let off pipes 4 are arranged adjustable cut-off devices 15, which may be set to have any effective cross section desired. The cutting-off members are appropriately turned by means of a lever-handle as indicated in Fig. 1, and may further for purposes of fine adjustment be fitted with a worm 16 which engages in a worm-wheel 17 of the cutting-off member, as in Fig. 3. The degree to which a change is effected in the cross-section within the cut-off device 15 may be seen from the scale 18. This scale is appropriately standardized in agreement with the percentages of the mixtures that can be selected. In order to eliminate all possibility of a suction effect taking place in the discharge pipe 4ª and the common pipe 20 liable to affect the rate of flow of the component ingredients, the interior of each cut-off device 15 communicates by means of a pipe 19, with the outer air, as is shown in Fig. 2. In order to facilitate the mixing of the liquids, measured-off according to their rates of flow by adjustment of taps 15, spiral passage-walls 21 can be arranged in the pipes 4ª, and baffle-plates 22 in the common pipe 20 (cf. Fig. 2). The simultaneous opening of the discharge of both component ingredients is effected, for example, by opening a three-branch tap 23, indicated in Figs. 1 and 2 in the cut-off position.

The height of liquid which determines the flow out pressure of the measured liquid is designated $h$. By changing the position of the lower end of the dip-pipe 3, this pressure can be varied to suit different sorts of liquids or for other purposes.

If it is desired to introduce simultaneously fresh liquid into containers 1 and 2, without interrupting the continuous withdrawal of the liquid mixture, the invention provides a cut-off device 15ª fitted in the introducing pipe 7 of each container vessel, said cut-off device, however, not being opened so wide as the discharge-device belonging thereto, in order to allow of the quantity flowing in remaining just a little behind the quantity discharged, and thus to prevent the effective liquid $h$ from being detrimentally affected by the inflow. These two cut-off devices can be positively coupled with each other by means of a connecting-rod arrangement 24, so that also in the event of an intermittent withdrawal of liquid mixture there ever flows in anew a quantity of fresh liquid maintained at a not quite equal level. By means of this arrangement in accordance with my invention the working can for instance be automatically set to one hundred times the contents of a container, before the surface of the liquid sinks to the point of the column of liquid $h$ affecting the flow-pressure. If that point is indicated by a signal, the operation need only be interrupted once at that moment for the purpose of refilling completely the containers 1 and 2 concerned, in order to ensure once more an automatic working for the next 10000 or 50000 liters flowing through.

What I claim as my invention and desire to secure by Letters Patent of the United States is:—

1. A device for mixing liquids in predetermined proportions, comprising, in combination, a container for each component ingredient of the mixture to be produced, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, means for starting the flow of all ingredients through their respective flow speed adjusting device simultaneously, each of said containers being closed and provided with a pressure restoring dip-pipe so as to act as a Mariotte jar, whereby the flow pressure in each abducting conduit is being maintained constant.

2. A device for mixing liquids in predetermined proportions, comprising in combination, a container for each component ingredient of the mixture to be produced, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, means for starting the flow of all ingredients through their respective flow speed adjusting devices simultaneously, and means whereby the interiors of said flow speed adjusting devices communicate with the outer air.

3. A device for mixing liquids in predetermined proportions, comprising, in combination, a container for each component ingredient of the mixture to be produced, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, means for starting the flow of all ingredients through their respective flow speed adjusting devices simultaneously, each of said containers being closed and provided with a pressure restoring dip-pipe so as to act as a Mariotte jar, whereby the flow pressure in each abducting conduit is being maintained constant, and a communication passage between the interior of each flow speed adjusting device and the outer air, whereby the production of a suction effect within said abducting conduits is prevented.

4. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, and means for starting the flow of all ingredients through their respective flow speed adjusting devices simultaneously.

5. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, at the lower end of each tube means adapted to prevent liquid from entering said tube but allowing air to pass through it in opposite direction, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, and means for starting the flow of all ingredients through their respective flow speed adjusting devices simultaneously.

6. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, means for starting the flow of all ingredients through their respective flow speed adjusting devices simultaneously, at the top of each container a self-closing valve opening towards the outer air, and an overflow tube with a liquid seal.

7. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, at the lower end of each tube means adapted to prevent liquid from entering said tube but allowing air to pass through it in opposite direction, at the top of each container a self-closing valve opening towards the outer air, and on each container an overflow tube with a liquid seal.

8. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, at the lower end of said tubes means for widely distributing air admitted through said tube, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, and means for starting the flow of all ingredients through their respective flow speed adjusting devices simultaneously.

9. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, means for starting the flow of all ingredients through their respective flow speed adjusting devices simultaneously, in connection with each container a supply pipe for fresh liquid, and within said supply pipe means whereby the quantity supplied can be dosed so as to be less than the quantity drawn off through said abducting conduit.

10. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, means for starting the flow of all ingredients through their respective flow speed adjusting devices simultaneously, in connection with each container a supply pipe for fresh liquid, and within said supply pipe means whereby the quantity supplied can be dosed so as to be less than the quantity drawn off through said abducting conduit, and a positive connection between said last named means and said flow speed adjusting device.

11. A device for mixing liquids in predetermined proportions, comprising, in combination, a closed container for each component ingredient of the mixture to be produced, in each container a pressure equalizing tube extending from the outer air into the liquid ingredient, said pressure equalizing tube being vertically adjustable, an abducting conduit on each container, a collecting conduit for all of said abducting conduits, in each abducting conduit a device for altering the cross section of said conduit in such a manner that the flowing speeds of the component ingredients may be adjusted in accordance to their proportions in the final mixture, means for starting the flow of all ingredients through their respective flow speed adjusting devices simultaneously, in connection with each container a supply pipe for fresh liquid, within said supply pipe means whereby the quantity supplied can be dosed so as to be less than the quantity drawn off through said abducting conduit, a positive connection between said last named means and said flow speed adjusting device, means in connection with the interior of each flow speed adjusting device whereby the production of a suction effect within said abducting conduits is prevented, and means for assisting the mixing of the measured ingredients.

HERMANN KAUWERTZ.